US012163781B2

(12) United States Patent
Kollmitzer et al.

(10) Patent No.: US 12,163,781 B2
(45) Date of Patent: Dec. 10, 2024

(54) APPARATUS AND METHOD FOR ASCERTAINING A ROTATION ANGLE

(71) Applicant: Infineon Technologies AG, Neubiberg (DE)

(72) Inventors: Benjamin Kollmitzer, Pörtschach (AT); Thomas Ganner, Krumpendorf (AT)

(73) Assignee: Infineon Technologies AG, Neubiberg (DE)

( * ) Notice: Subject to any disclaimer, the term of this patent is extended or adjusted under 35 U.S.C. 154(b) by 278 days.

(21) Appl. No.: 16/948,088

(22) Filed: Sep. 2, 2020

(65) Prior Publication Data

US 2021/0072016 A1 Mar. 11, 2021

(30) Foreign Application Priority Data

Sep. 11, 2019 (DE) .......................... 102019124371.8

(51) Int. Cl.
*G01B 7/30* (2006.01)
*G01D 5/14* (2006.01)

(52) U.S. Cl.
CPC ............... *G01B 7/30* (2013.01); *G01D 5/145* (2013.01)

(58) Field of Classification Search
None
See application file for complete search history.

(56) References Cited

U.S. PATENT DOCUMENTS

| 8,093,886 | B2* | 1/2012 | Okada .................... | G01D 5/145 324/207.21 |
|---|---|---|---|---|
| 8,589,105 | B2* | 11/2013 | Komasaki .............. | G01D 5/145 702/90 |
| 8,884,611 | B2 | 11/2014 | Hunger | |
| 9,062,989 | B2 | 6/2015 | Van Veldhoven | |
| 9,863,788 | B2 | 1/2018 | Ausserlechner | |
| 10,612,942 | B2* | 4/2020 | Yoshiya ................. | G01D 5/147 |
| 10,718,633 | B2 | 7/2020 | Spitzer et al. | |
| 10,989,516 | B2 | 4/2021 | Ausserlechner | |
| 2008/0048654 | A1* | 2/2008 | Takahashi ............ | G01D 5/2448 324/207.25 |

(Continued)

FOREIGN PATENT DOCUMENTS

| CN | 101918796 A | 12/2010 |
|---|---|---|
| CN | 102141371 A | 8/2011 |

(Continued)

*Primary Examiner* — Shelby A Turner
*Assistant Examiner* — Brandon J Becker
(74) *Attorney, Agent, or Firm* — Harrity & Harrity, LLP

(57) ABSTRACT

The present disclosure relates to an apparatus for ascertaining a rotation angle of a magnetic field orientation-influencing test object with an axis of rotation in the z-direction. The apparatus may include at least three first magnetic field sensor elements, which are sensitive to magnetic field components in the z-direction. The apparatus may include at least three second magnetic field sensor elements, which are sensitive to magnetic field components in an xy-plane. The apparatus may include a device for ascertaining the rotation angle on the basis of a first combination signal which is based on multiple combinations of measurement signals from the first magnetic field sensor elements and the second magnetic field sensor elements.

20 Claims, 7 Drawing Sheets

(56) References Cited

U.S. PATENT DOCUMENTS

| | | | |
|---|---|---|---|
| 2008/0136405 A1* | 6/2008 | Cochran | G01B 7/003 324/207.11 |
| 2009/0174395 A1 | 7/2009 | Thomas et al. | |
| 2011/0031965 A1* | 2/2011 | Saruki | G01D 3/036 324/207.25 |
| 2012/0038351 A1* | 2/2012 | Saruki | G01D 5/145 324/207.25 |
| 2014/0292313 A1* | 10/2014 | Ueda | G01B 7/14 324/207.21 |
| 2015/0137797 A1 | 5/2015 | Ausserlechner et al. | |
| 2015/0285661 A1* | 10/2015 | Ausserlechner | G01D 5/24485 324/207.21 |
| 2016/0169707 A1* | 6/2016 | Hirota | G01D 5/145 702/151 |
| 2017/0045377 A1 | 2/2017 | Vallmajo I Ribas | |
| 2017/0052038 A1* | 2/2017 | Aichriedler | G01D 5/145 |
| 2018/0087888 A1 | 3/2018 | Ausserlechner | |
| 2018/0135961 A1 | 5/2018 | Vandersteegen et al. | |
| 2018/0238711 A1 | 8/2018 | Zimmer | |
| 2019/0226875 A1* | 7/2019 | Li | H04R 1/1066 |
| 2019/0250222 A1 | 8/2019 | Friedrich et al. | |
| 2019/0301893 A1 | 10/2019 | Ruigrok et al. | |
| 2020/0166325 A1 | 5/2020 | Ausserlechner et al. | |
| 2021/0364325 A1 | 11/2021 | Ausserlechner | |

FOREIGN PATENT DOCUMENTS

| | | |
|---|---|---|
| CN | 102564468 A | 7/2012 |
| CN | 104656042 A | 5/2015 |
| CN | 104976948 A | 10/2015 |
| CN | 105181992 A | 12/2015 |
| CN | 105403233 A | 3/2016 |
| CN | 106443521 A | 2/2017 |
| CN | 107121057 A | 9/2017 |
| CN | 107389100 A | 11/2017 |
| CN | 107869951 A | 4/2018 |
| CN | 107869952 A | 4/2018 |
| CN | 108072318 A | 5/2018 |
| CN | 109990697 A | 7/2019 |
| DE | 4141000 A1 | 6/1992 |
| DE | 102014116826 A1 | 5/2015 |
| EP | 3045870 A1 | 7/2016 |

* cited by examiner

APPARATUS AND METHOD FOR ASCERTAINING A ROTATION ANGLE

CROSS REFERENCE TO RELATED APPLICATION

This application claims priority to German Patent Application No. 102019124371.8 filed on Sep. 11, 2019, the content of which is incorporated by reference herein in its entirety.

TECHNICAL FIELD

The present disclosure relates, in general, to position or angle sensors and, for example, to angle sensors which take account of mechanical misalignments between sensor elements and test object.

BACKGROUND

Magnetic position or angle sensors are used, for example in the automotive sector, to resolve linear and rotation angle positions. Angle sensors can be realized using magnetic field sensors, for example, which are placed in the vicinity of a rotating test object such as a shaft. Here, a first measurement value (X) can be determined as a function of a magnetic field which depends on a rotation angle θ of the test object. Further, a second measurement value (Y) can be determined as a function of a magnetic field which depends on the rotation angle θ of the test object. In an ideal case, the two measurement values correspond to periodic signals of the form $X=A*\cos(\theta)$ and $Y=A*\sin(\theta)$. Then, using the known rule $\theta=a\tan(Y/X)$, it is possible to deduce the rotation angle θ of the test object.

With increasing electrification in the automotive sector, the effects of unwanted stray fields are becoming ever more serious. This limits the accuracy that is achievable with conventional magnetic position or angle sensors and requires novel concepts, which are referred to as stray field-robust position or rotation angle sensors.

Frequently employed stray field-robust position or angle sensors have spatially separated sensor elements. Here, a sensor element can denote any apparatus that can be used to measure a magnetic field component (e.g., x-, y- or z-component). Typical sensor elements include Hall plates, vertical Hall probes, anisotropic magnetoresistance (AMR) elements, giant magnetoresistance (GMR) elements, tunnel magnetoresistance (TMR) elements, etc. A plurality of sensor elements can be placed tightly next to one another in order to improve impedance matching, a signal-to-noise ratio, etc. Such an arrangement of a plurality of sensor elements at practically the same position can be referred to as a single sensor element within the meaning of the stray field.

Some conventional stray field-robust angle sensors for so-called end-of-shaft applications comprise four horizontal or lateral Hall plates, which are situated at the corners of a uniform cross. Alternatively, three lateral Hall plates could also be aligned in a triangle, for example. The axis of rotation, for example of a shaft, is ideally designed such that it extends directly through the center of this cross/triangle. A magnet which may have diametrical or antiparallel magnetization can be mounted to the end of the shaft. The angular accuracy of such an arrangement is usually severely restricted by the positioning tolerance of the sensor. Displacements or misalignments of one tenth of the magnetic diameter can already restrict the achievable accuracy to approximately 1°.

However, in practice, it is often not possible to entirely avoid mechanical misalignments between the sensor elements and test object or magnet, and so there are different amplitudes, offsets and phase shifts of the periodic signals X and Y, which in turn may lead to incorrect angle estimates. Causes for mechanical misalignments include x-, y-displacement between sensor elements and test object or magnet, air gap variations (z-displacement), various types of inclination (e.g., package or housing inclination) and/or magnetization inclination.

SUMMARY

Compensating for misalignments between sensor elements and test object may be achieved by the apparatuses and methods according to implementations described herein.

According to a first aspect of the present disclosure, an apparatus is proposed for ascertaining a rotation angle θ of a magnetic field orientation-influencing test object with an axis of rotation nominally in the z-direction. The z-direction is understood to be one spatial direction of a 3-dimensional coordinate system (x, y, z). The apparatus comprises at least three first magnetic field sensor elements, which are arranged uniformly about the axis of rotation and each of which are sensitive to magnetic field components in the z-direction. Moreover, the apparatus comprises at least three second magnetic field sensor elements, which are arranged uniformly about the axis of rotation and each of which are sensitive to magnetic field components in an xy-plane. Arranged uniformly about the axis of rotation can also be understood to mean arranged symmetrically about the axis of rotation. Further, provision is made of a device (e.g., a processor) for ascertaining the rotation angle θ, which device is embodied to ascertain the rotation angle θ on the basis of a first combination signal ΔZn which is based on a first combination of measurement signals from the first magnetic field sensor elements, a second combination signal ΔZd which is based on a second combination of measurement signals from the first magnetic field sensor elements, a third combination signal ΔVn which is based on a first combination of measurement signals from the second magnetic field sensor elements, and a fourth combination signal ΔVd which is based on a second combination of measurement signals from the second magnetic field sensor elements.

Thus, in comparison with conventional stray field-robust angle sensors, the use of additional magnetic field sensor elements is proposed. Conventional stray field-robust angle sensors consist of magnetic field sensor elements which can only measure an out-of-plane component (e.g., the z-component) of a magnetic field at different spatial positions. From this, it is possible to derive robust stray field variables (e.g., measuring the difference voltage), with the aid of which an angle position can be determined within the meaning of stray field robustness. Additional magnetic field sensor elements are proposed according to the present disclosure, the additional magnetic field sensor elements additionally measuring the in-plane component (e.g., in the xy-plane) of the magnetic field at different spatial positions. Then, the rotation angle θ can be estimated by combining the resultant measurement signals by calculation.

According to some example implementations, the device for ascertaining the rotation angle θ is further embodied to ascertain a displacement or misalignment (Rx, Ry) of the axis of rotation from a nominal zero position on the basis of the four combination signals. Thus, the additional magnetic field sensor elements allow estimation of not only the rotation angle θ but also the displacement or misalignment (Rx, Ry). The estimates for rotation angle θ and misalignment (Rx, Ry) can each be ascertained iteratively and influence one another in the process.

In principle, the estimates of rotation angle θ and/or misalignment (Rx, Ry) can be based on numerous mathematical models which are suitable for modeling actual movement sequences (e.g., wobbling) of the test object. According to some example implementations, each of the combination signals is able to be modeled by a respective Fourier series for the rotation angle θ. Fourier coefficients of each of the Fourier series are respectively able to be modeled by Taylor series for the displacement (Rx, Ry) of the axis of rotation from the nominal zero position. In such example implementations, the device for ascertaining the rotation angle θ is embodied to additionally ascertain the rotation angle θ on the basis of predefined Taylor coefficients of the Taylor series. By way of example, the predefined Taylor coefficients could be ascertained in advance by calculation, simulation, and/or calibration and could be stored in a memory. Consequently, these are available for calculations for estimating the rotation angle θ and/or the misalignment (Rx, Ry).

According to some example implementations, the first magnetic field sensor elements (which are sensitive in the z-direction) comprise lateral Hall sensor elements. The second magnetic field sensor elements (which are sensitive in the xy-plane) could have vertical Hall sensor elements. Naturally, other implementations are also conceivable, within the scope of which the first and second magnetic field sensor elements are implemented by magnetoresistive magnetic field sensor elements (e.g., AMR, GMR, TMR) with different reference magnetizations, for example.

For the aforementioned end-of-shaft applications, the test object could for example comprise a shaft, extending in the z-direction, with a magnet mounted to one end of the shaft. However, the test object itself need not necessarily have a magnet. Implementations in which the test object modifies an external magnetic field depending on the rotation angle θ are also conceivable.

According to some example implementations, N first magnetic field sensor elements are arranged nominally symmetrically with an angular spacing of 360°/N about the axis of rotation. N second magnetic field sensor elements are likewise arranged nominally symmetrically with an angular spacing of 360°/N about the axis of rotation. Here, nominally symmetric can be understood to mean referring to ideal circumstances without misalignments. The first and second magnetic field sensor elements are situated at substantially the same positions. In the case of N=4, for example, four first magnetic field sensor elements are arranged nominally symmetrically with an angular spacing of 90° about the axis of rotation. At the same angular positions, four second magnetic field sensor elements are also arranged nominally symmetrically with an angular spacing of 90° about the axis of rotation.

According to some example implementations, four first magnetic field sensor elements are arranged nominally symmetrically with an angular spacing of 90° about the axis of rotation. The first combination signal ΔZn could correspond to a first difference of two weighted measurement signals of the first magnetic field sensor elements lying opposite one another at an angle of 180°. The second combination signal ΔZd could correspond to a second difference of two weighted measurement signals of the other first magnetic field sensor elements lying opposite one another at an angle of 180°. Equally, four second magnetic field sensor elements can be arranged nominally symmetrically with an angular spacing of 90° about the axis of rotation. The third combination signal ΔVn could correspond to a first difference of two weighted measurement signals of the second magnetic field sensor elements lying opposite one another at an angle of 180°. The fourth combination signal ΔVd could correspond to a second difference of two weighted measurement signals of the other second magnetic field sensor elements lying opposite one another at an angle of 180°.

According to some example implementations, three first magnetic field sensor elements could be arranged nominally symmetrically with an angular spacing of 120° about the axis of rotation. The first combination signal ΔZn could correspond to a first combination of three weighted measurement signals of the first magnetic field sensor elements spaced apart from one another at an angle of 120°. The second combination signal ΔZd could correspond to a second combination of three weighted measurement signals of the first magnetic field sensor elements. Equally, three second magnetic field sensor elements can be arranged with an angular spacing of 120° about the axis of rotation. The third combination signal ΔVn could correspond to a first combination of three weighted measurement signals of the second magnetic field sensor elements spaced apart from one another at an angle of 120°. The fourth combination signal ΔVd could correspond to a combination of three weighted measurement signals of the second magnetic field sensor elements.

According to some example implementations, as already mentioned above, each of the combination signals is able to be modeled by a respective Fourier series for the rotation angle θ. A Fourier series denotes a series expansion of a periodic, piecewise continuous function into a function series of sine and cosine functions. By way of example, the first combination signal ΔZn can be modeled by a first Fourier series for the rotation angle θ as per $$\Delta Zn = z_{nc}(Rx,Ry)\cdot\cos\theta + z_{ns}(Rx,Ry)\cdot\sin\theta + z_{n0}(Rx,Ry),$$

with Fourier coefficients $z_{nc}(Rx, Ry)$, $z_{ns}(Rx, Ry)$, $z_{n0}(Rx, Ry)$ that depend on the displacement (Rx, Ry) of the axis of rotation. The second combination signal ΔZd can be modeled by a second Fourier series for the rotation angle θ as per $$\Delta Zd = z_{dc}(Rx,Ry)\cdot\cos\theta + z_{ds}(Rx,Ry)\cdot\sin\theta + z_{d0}(Rx,Ry),$$

with Fourier coefficients $z_{dc}(Rx, Ry)$, $z_{ds}(Rx, Ry)$, $z_{d0}(Rx, Ry)$ that depend on the displacement (Rx, Ry) of the axis of rotation from the zero position. The third combination signal ΔVn can be modeled by a third Fourier series for the rotation angle θ as per $$\Delta Vn = v_{nc}(Rx,Ry)\cdot\cos\theta + v_{ns}(Rx,Ry)\cdot\sin\theta + v_{n0}(Rx,Ry),$$

with Fourier coefficients $v_{nc}(Rx, Ry)$, $v_{ns}(Rx, Ry)$, $v_{n0}(Rx, Ry)$ that depend on the displacement (Rx, Ry) of the axis of rotation. The fourth combination signal ΔVd can be modeled by a fourth Fourier series for the rotation angle θ as per $$\Delta Vd = v_{dc}(Rx,Ry)\cdot\cos\theta + v_{ds}(Rx,Ry)\cdot\sin\theta + v_{d0}(Rx,Ry),$$

with Fourier coefficients $v_{dc}(Rx, Ry)$, $v_{ds}(Rx, Ry)$, $v_{d0}(Rx, Ry)$ that depend on the displacement (Rx, Ry) of the axis of rotation.

According to some example implementations, the Fourier coefficients $w_{ij}(Rx, Ry)$ with $w \in \{v, z\}$, $i \in \{n, d\}$, and $j \in \{c, s, 0\}$ can be modeled as Taylor series as per $$w_{ij}(Rx,Ry) = w_{ijxx} \cdot Rx^2 + w_{ijxy} \cdot Rx \cdot Ry + w_{ijyy} \cdot Ry^2 + w_{ijx} \cdot Rx + w_{ijy} \cdot Ry + w_{ij0}$$

with the predefined Taylor coefficients $w_{ijxx}$, $w_{ijxy}$, $w_{ijyy}$, $w_{ijx}$, $w_{ijy}$, $w_{ij0}$. Other series expansion may also come into question here, depending on the motion of the test object intended to be modeled.

According to some example implementations, the device for ascertaining the rotation angle is embodied to numerically solve the equations above in order to ascertain estimated values for the rotation angle θ and/or the displacement (Rx, Ry) of the axis of rotation.

According to some example implementations, the device for ascertaining the rotation angle is embodied to ascertain, in an initial calculation step, an initial estimated value for the rotation angle θ on the basis of the assumption of no displacement (Rx, Ry) of the axis of rotation being present, corresponding to the zero position, and on the basis of the first and second combination signal ΔZn, ΔZd. By way of example, the device for ascertaining the rotation angle is embodied to ascertain the initial estimated value for the rotation angle (θ) on the basis of $$\theta^{(0)} = \operatorname{atan}\left(\frac{z_{dc}^{(0)} \cdot \Delta Zn}{z_{ns}^{(0)} \cdot \Delta Zd}\right)$$

where $z_{dc}^{(0)}$, $z_{ns}^{(0)}$ correspond to predetermined Fourier coefficients when there is no displacement of the axis of rotation, corresponding to the zero position.

According to some example implementations the device for ascertaining the rotation angle is embodied to ascertain an updated estimated value for the displacement ($Rx^{(m+1)}$, $Ry^{(m+1)}$) of the axis of rotation on the basis of a current estimated value $\theta^{(m)}$ for the rotation angle, the third and fourth combination signal ΔVn, ΔVd, and the predefined Taylor coefficients. To this end, the device for ascertaining the rotation angle can be embodied to ascertain the updated estimated value for the displacement (Rx, Ry) of the axis of rotation on the basis of $$\begin{pmatrix} Rx^{(m+1)} \\ Ry^{(m+1)} \end{pmatrix} = \begin{pmatrix} v_{ncx} \cdot \cos\theta^{(m)} & v_{nsy} \cdot \sin\theta^{(m)} \\ v_{dcx} \cdot \cos\theta^{(m)} & v_{dsy} \cdot \sin\theta^{(m)} \end{pmatrix}^{-1} \cdot \begin{pmatrix} \Delta Vn \\ \Delta Vd \end{pmatrix}$$

where m denotes an m-th iteration step.

According to some example implementations, the device for ascertaining the rotation angle is embodied to ascertain updated Fourier coefficients on the basis of the updated estimated value ($Rx^{(m+1)}$, $Ry^{(m+1)}$) for the displacement and to ascertain an updated estimated value $\theta^{(m+1)}$ for the rotation angle on the basis of the updated Fourier coefficients and the first and second combination signal (ΔZn, ΔZd). By way of example, the device for ascertaining the rotation angle can be embodied to ascertain the updated estimated value for the rotation angle (θ) on the basis of $$\begin{pmatrix} \cos\theta^{(m+1)} \\ \sin\theta^{(m+1)} \end{pmatrix} = \begin{pmatrix} z_{nc}^{(m+1)} & z_{ns}^{(m+1)} \\ z_{dc}^{(m+1)} & z_{ds}^{(m+1)} \end{pmatrix}^{-1} \cdot \begin{pmatrix} \Delta Zn - z_{n0}^{(m+1)} \\ \Delta Zd - z_{d0}^{(m+1)} \end{pmatrix}$$

where m denotes an m-th iteration step.

According to a further aspect of the present disclosure, a method for ascertaining a rotation angle θ of a magnetic field orientation-influencing test object with an axis of rotation in the z-direction is proposed, wherein at least three first magnetic field sensor elements, each of which being sensitive to magnetic field components in the z-direction, are arranged uniformly about the axis of rotation and wherein at least three second magnetic field sensor elements, each of which being sensitive to magnetic field components in an xy-plane, are arranged uniformly about the axis of rotation. The method comprises the steps of ascertaining a first combination signal (ΔZn) on the basis of a first combination of measurement signals from the first magnetic field sensor elements, ascertaining a second combination signal (ΔZd) on the basis of a second combination of measurement signals from the first magnetic field sensor elements, ascertaining a third combination signal (ΔVn) on the basis of a first combination of measurement signals from the second magnetic field sensor elements, ascertaining a fourth combination signal (ΔVd) on the basis of a second combination of measurement signals from the second magnetic field sensor elements, and ascertaining the rotation angle θ on the basis of the four combination signals.

Example implementations of the present disclosure allow system costs for stray field applications with a robust angle measurement to be brought down since the displacement compensation can tolerate greater inaccuracies in the mechanism. This allows manufacturing and alignment to become simpler and more cost-effective.

BRIEF DESCRIPTION OF THE FIGURES

A few examples of apparatuses and/or methods are explained in more detail below merely by way of example with reference to the appended figures. In the figures.

DESCRIPTION

Various examples will now be described in more detail with reference to the appended figures, in which a number of examples are illustrated. In the figures, the thicknesses of lines, layers and/or regions may be exaggerated for clarification.

Further examples are suitable for different modifications and alternative forms, and consequently a few specific examples thereof are shown in the figures and will be described in detail below. However, this detailed description does not limit further examples to the described specific forms. Further examples may cover all modifications, correspondences and alternatives that fall within the scope of the disclosure. The same or similar reference signs relate throughout the description of the figures to the same or similar elements, which upon comparison with one another may be implemented identically or in a modified form, while providing the same or a similar function.

It is to be understood that where an element is referred to as being "connected" or "coupled" to another element, the elements may be connected or coupled directly or via one or more intermediate elements. When two elements A and B are combined using an "or", this is to be understood to mean that all possible combinations are disclosed, e.g. only A, only B, and also A and B, unless explicitly or implicitly defined otherwise. An alternative wording for the same combinations is "at least one of A and B" or "A and/or B". The same applies, mutatis mutandis, to combinations of more than two elements.

The terms used here to describe specific examples are not intended to be limiting for further examples. If a singular form, e.g. "a, an" and "the", is used and the use only of a single element is defined as being neither explicitly nor implicitly binding, further examples may also use plural elements to implement the same function. When a function is described below as being implemented using a plurality of elements, further examples may implement the same function using a single element or a single processing entity. Furthermore, it is understood that the terms "comprises", "comprising", "has" and/or "having" when used concretize the presence of the indicated features, whole numbers, steps, operations, processes, elements, components and/or a group thereof, but do not exclude the presence or the addition of one or more further features, whole numbers, steps, operations, processes, elements, components and/or a group thereof.

Unless this is otherwise defined, all terms (including technical and scientific terms) are used here in their typical meaning in the field to which examples belong.

Figure 1A:
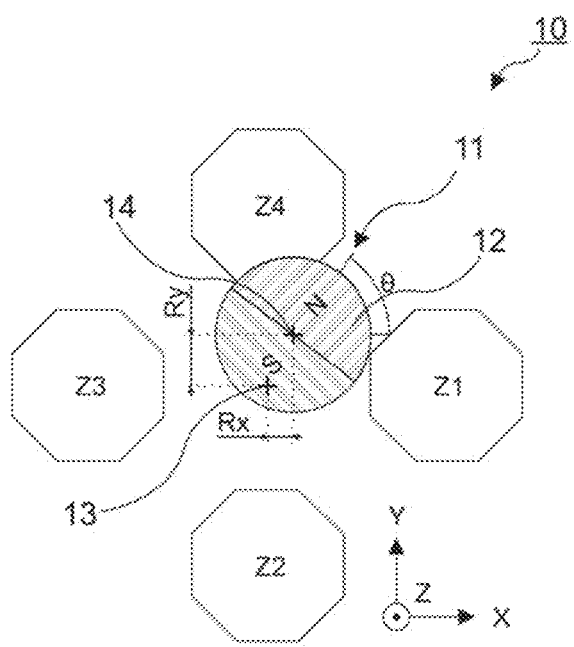
FIG. 1A shows a simulation set up with four lateral Hall plates Z1-Z4 and a diametrically magnetized magnet; the magnet is displaced by a vector (Rx, Ry) from the center of the sensor elements in the xy-plane.

FIG. 1A shows a plan view of a magneto-mechanical system 10 with a test object 11 in the form of a shaft with a magnet 12 at its end face. In the illustrated example, four magnetic field sensor elements Z1, . . . , Z4 are arranged around the test object 11 in order to ascertain a rotation angle θ of the test object 11 on the basis of the magnetic field that rotates with the test object 11. The arrangement in FIG. 1A is a conventional stray field-robust angle sensor arrangement, already mentioned at the outset, for so-called end-of-shaft applications with four uniformly arranged magnetic field sensor elements Z1, . . . , Z4, which are situated at the corners of a symmetric cross centered at center of rotation 13. Alternatively, three lateral magnetic field sensor elements could also be aligned in a triangle.

Figure 1B:
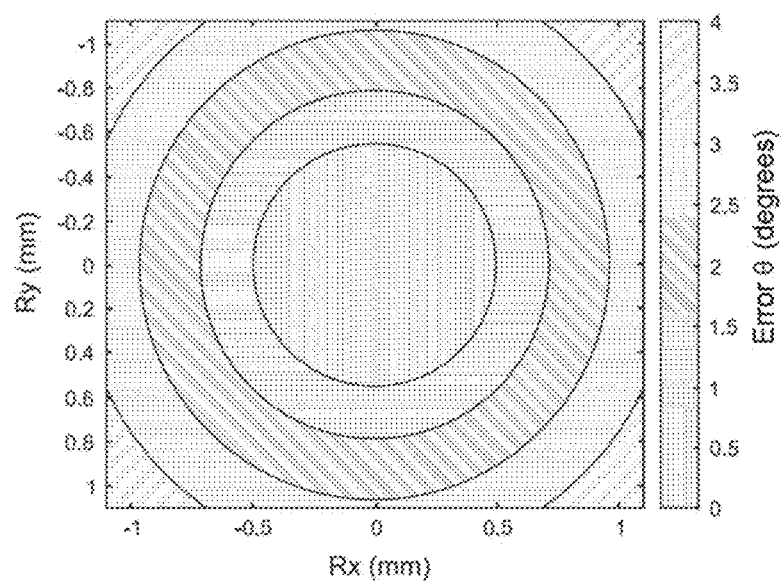
FIG. 1B shows an error in the reconstructed angle θ on account of the displacement (Rx, Ry)

Ideally, an axis of rotation 14 of the test object 11 extends directly through the center of rotation 13 of the cross/triangle. However, mechanical misalignments between the sensor elements Z1, . . . , Z4 and the test object 11 often cannot be entirely avoided in practice. FIG. 1A shows a displacement or misalignment (Rx, Ry) of the axis of rotation 14 of the shaft from the nominal zero position at center of rotation 13. As this displacement or misalignment (Rx, Ry) increases, so do the errors in the rotation angle estimate. FIG. 1B shows an example diagram, according to which angle errors of more than 3° can arise in the case of a misalignment of (Rx=1 mm, Ry=1 mm). This may be unacceptable in some critical applications.

Figure 1C:
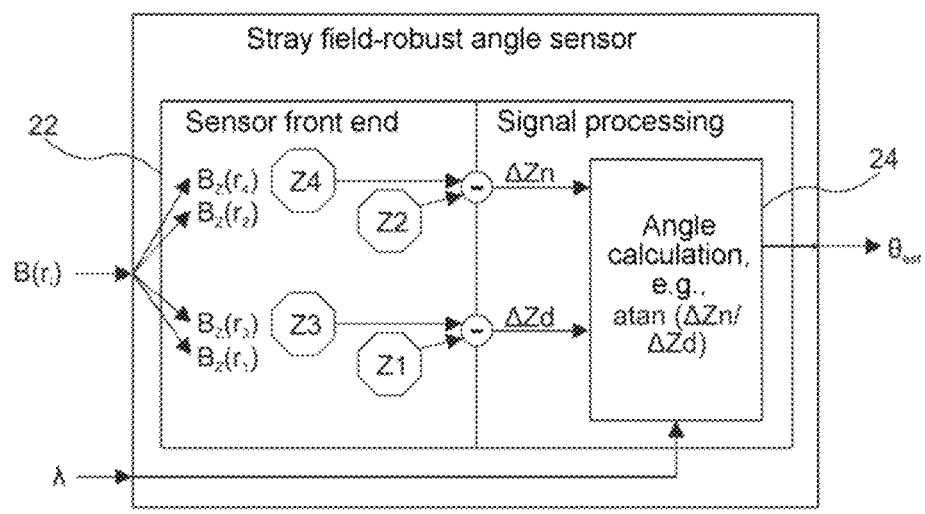
FIG. 1C shows a conventional stray field-robust angle sensor with 4 sensor elements which measure the magnetic field components normal to the sensor plane.

FIG. 1C explains the measurement principle of the magneto-mechanical system 10.

The magneto-mechanical system 10 with the four magnetic field sensor elements Z1, . . . , Z4 serves as a sensor front end 15. Each magnetic field sensor element Z1, . . . , Z4, arranged in nominally symmetric fashion with an angular spacing of 90° about the axis of rotation (in the z-direction), is sensitive to magnetic field components $B_z(r_i)$ in the z-direction at their respective location $r_i$ (i=1, . . . , 4). A first combination signal ΔZn formed by a processor 16 corresponds to a first difference (Z4−Z2) of two measurement signals of first magnetic field sensor elements Z2, Z4 lying opposite one another at an angle of 180°. A second combination signal ΔZd formed by the processor 16 corresponds to a second difference (Z1−Z3) of two measurement signals of the two other first magnetic field sensor elements Z1, Z3 lying opposite one another at an angle of 180°. On the basis of the two combination signals ΔZn, ΔZd, the processor 16 is able to calculate an estimated value $\theta_{est}$ for the rotation angle of the test object 11, for example as per $\theta_{est}$=a tan(ΔZn/ΔZd). Conventional corrections for offset, sensitivity mismatch between magnetic field sensor elements, orthogonality, and reference angle can be carried out on the basis of a set of compensation parameters λ.

However, using the conventional sensor apparatuses explained on the basis of FIGS. 1A-C, it is not possible to compensate the displacement or misalignment (Rx, Ry) of the axis of rotation 14 of the shaft from the nominal zero position at center of rotation 13. The present disclosure therefore proposes to ascertain the displacement (Rx, Ry) of the axis of rotation 14 of the shaft, or of the magnet 12, from the center of rotation 13 of the sensor elements and compensate the estimate for the angle on the basis of this information. FIGS. 2A, 2B and 3A, 3B show possible measurement systems to this end, in accordance with example implementations of the present disclosure.

Figure 2A:
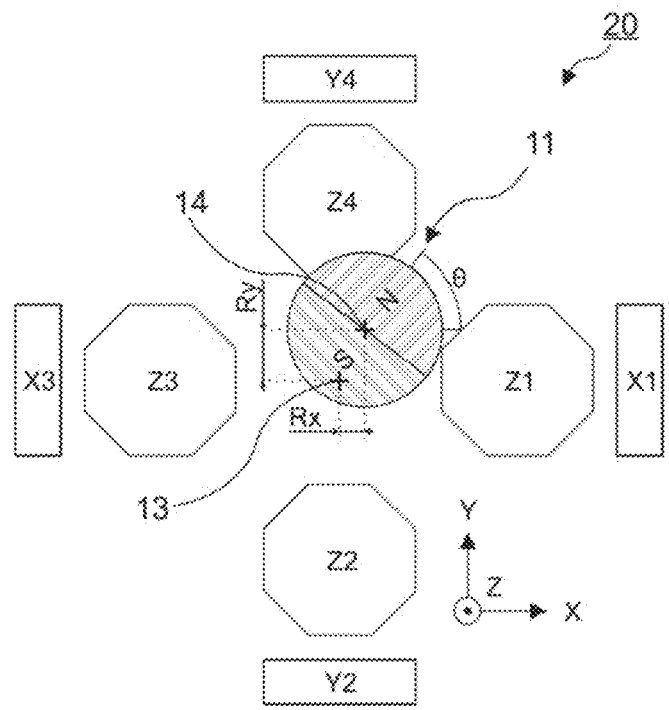
FIG. 2A shows a set up with four first magnetic field sensor elements and four second magnetic field sensor elements arranged around a test object.

FIG. 2A shows a plan view of a magneto-mechanical system 20, which differs from the system 10 by four second magnetic field sensor elements X1, Y2, X3, Y4, which are uniformly arranged around the nominal center of rotation 13. The second magnetic field sensor elements X1, Y2, X3, Y4 are likewise situated on the limbs of the uniform cross centered at 13, and hence at the same angle positions as the first magnetic field sensor elements Z1, . . . , Z4, and the second magnetic field sensor elements are each sensitive to magnetic field components in the xy-plane (in-plane components). Thus, example implementations of the present disclosure comprise additional magnetic field sensor elements, which measure the components of the magnetic field in the plane (e.g., X1 and X3 for Bx and Y2 and Y4 for By). The first and second magnetic field sensor elements can be situated at substantially the same positions in space.

Figure 2B:
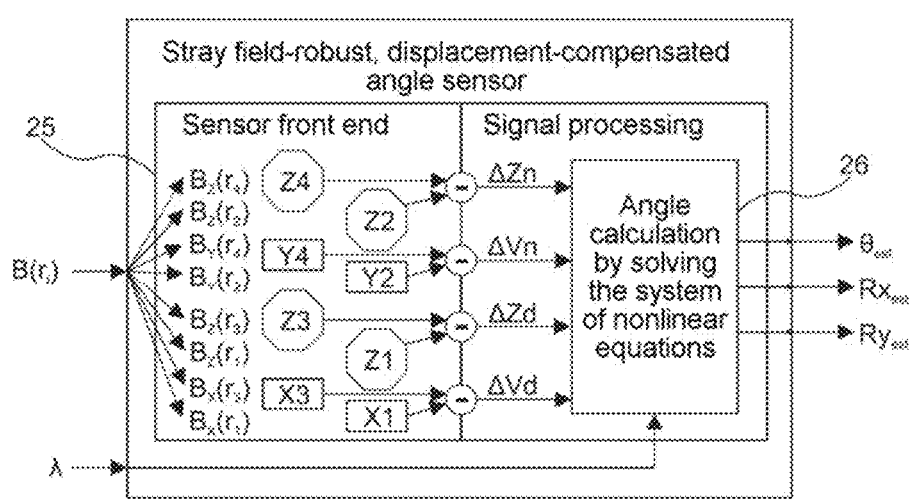
FIG. 2B shows a stray field-robust angle sensor with four first magnetic field sensor elements, which measure magnetic field components normal to the sensor plane, and four second magnetic field sensor elements, which measure magnetic field components lying in the sensor plane.

FIG. 2B explains the measurement principle of the magneto-mechanical system 20.

The magneto-mechanical system 20 with the four first magnetic field sensor elements Z1, ..., Z4 and the four second magnetic field sensor elements X1, Y2, X3, Y4 serves as a sensor front end 25. Each first magnetic field sensor element Z1, ..., Z4, arranged in nominally symmetric fashion with an angular spacing of 90° about the nominal center of rotation 13, is sensitive to magnetic field components $B_z(r_i)$ in the z-direction at their respective location $r_i$ (i=1, ..., 4). Each second magnetic field sensor element X1, Y2, X3, Y4, likewise arranged in nominally symmetric fashion with an angular spacing of 90° and at the same angle positions around the nominal center of rotation 13, is sensitive to magnetic field components $B_x(r_i)$ and $B_y(r_i)$, respectively, in the xy-plane at their respective location $r_i$ (i=1, ..., 4). A first combination signal ΔZn formed by a processor 26 corresponds to a first difference (Z4–Z2) of two measurement signals of first magnetic field sensor elements Z2, Z4 lying opposite one another at an angle of 180°. A second combination signal ΔZd formed by the processor 16 corresponds to a second difference (Z1–Z3) of two measurement signals of the two other first magnetic field sensor elements Z1, Z3 lying opposite one another at an angle of 180°. A third combination signal ΔVn formed by the processor 16 corresponds to a first difference (Y4–Y2) of two measurement signals of second magnetic field sensor elements Y2, Y4 lying opposite one another at an angle of 180°. A fourth combination signal ΔVd formed by the processor 16 corresponds to a second difference (X1–X3) of two measurement signals of the other second magnetic field sensor elements X1, X3 lying opposite one another at an angle of 180°. As will be explained below, the processor 16 is able to calculate an estimated value $θ_{est}$ for the rotation angle of the test object 11 on the basis of the four combination signals ΔZn, ΔZd, ΔVn, ΔVd. Optionally, the processor 16 can also ascertain an estimated value ($Rx_{est}$, $Ry_{est}$) for the displacement of the axis of rotation 14 from the nominal center of rotation 13 on the basis of the four combination signals.

Figure 3A:
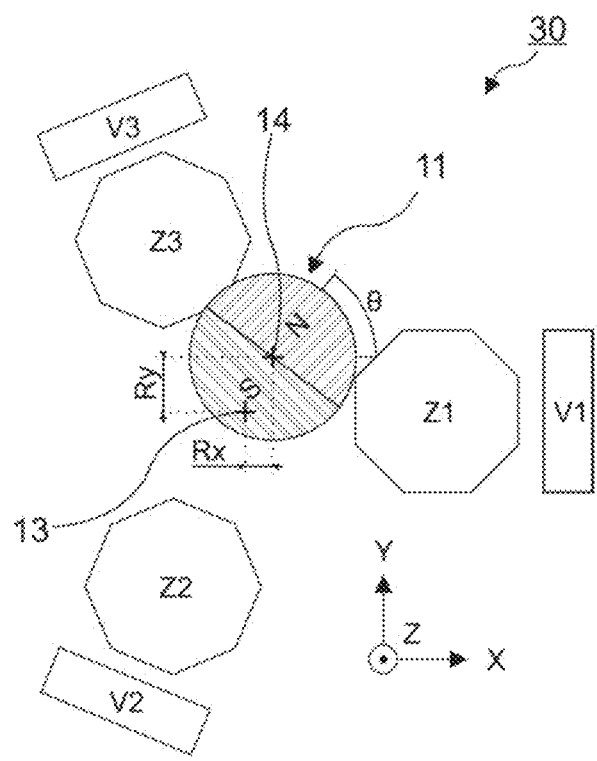
FIG. 3A shows a set up with three first magnetic field sensor elements and three second magnetic field sensor elements arranged around a test object.

FIG. 3A shows a further magneto-mechanical system 30 according to one example implementation, which differs from the system 20 in that only three first magnetic field sensor elements Z1, ..., Z3, arranged uniformly about the nominal center of rotation 13, and three second magnetic field sensor elements V1, ..., V3, arranged uniformly about the nominal center of rotation 13, are provided.

Figure 3B:
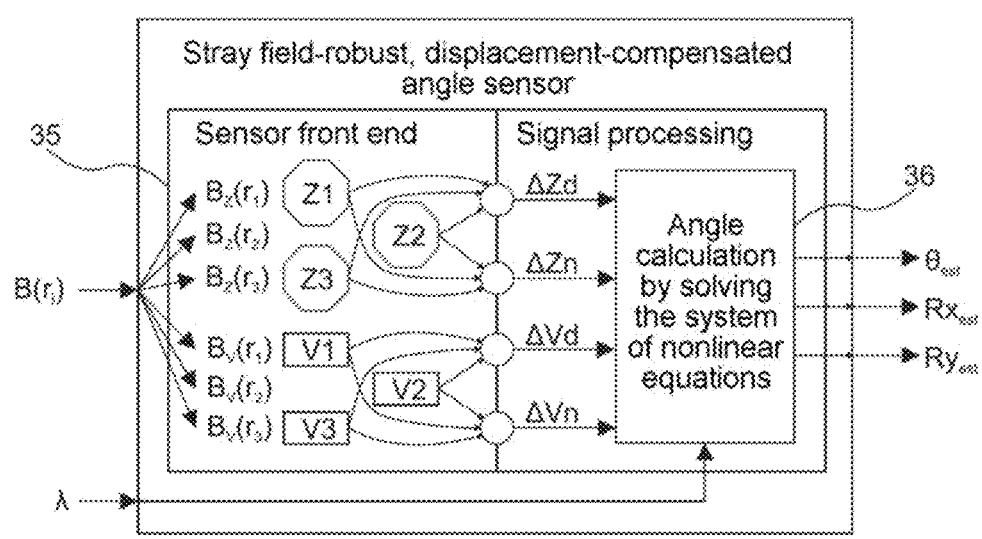
FIG. 3B shows a stray field-robust angle sensor with three first magnetic field sensor elements, which measure magnetic field components normal to the sensor plane, and three second magnetic field sensor elements, which measure magnetic field components lying in the sensor plane.

FIG. 3B explains the measurement principle of the magneto-mechanical system 30.

The magneto-mechanical system 30 with the three first magnetic field sensor elements Z1, Z2, Z3 and the three second magnetic field sensor elements V1, V2, V3 serves as a sensor front end 35. Each first magnetic field sensor element Z1, Z2, Z3, arranged in nominally symmetric fashion with an angular spacing of 120° about the nominal center of rotation 13, is sensitive to magnetic field components $B_z(r_i)$ in the z-direction at their respective location (i=1, ..., 3). Each second magnetic field sensor element V1, V2, V3, likewise arranged in nominally symmetric fashion with an angular spacing of 120° and at the same angle position around the nominal center of rotation 13, is sensitive to magnetic field components $B_v(r_i)$ in the xy-plane at their respective location $r_i$ (i=1, ..., 3). A first combination signal ΔZn formed by a processor 36 corresponds to a first combination of three weighted measurement signals of first magnetic field sensor elements spaced apart from one another at an angle of 120°. A second combination signal ΔZd formed by the processor 36 corresponds to a second combination of three weighted measurement signals of the first magnetic field sensor elements. A third combination signal ΔVn formed by the processor 36 corresponds to a first combination of three weighted measurement signals of the second magnetic field sensor elements V1, V2, V3 spaced apart from one another at an angle of 120°. A fourth combination signal ΔVd formed by the processor 36 corresponds to a second combination of three weighted measurement signals of the second magnetic field sensor elements. As will be explained below, the processor 36 is able to calculate the estimated value $θ_{est}$ for the rotation angle of the test object 11 on the basis of the four combination signals ΔZn, ΔZd, ΔVn, ΔVd. Optionally, the processor 16 can also ascertain an estimated value ($Rx_{est}$, $Ry_{est}$) for the displacement of the axis of rotation 14 from the nominal center of rotation 13 on the basis of the four combination signals.

The output (e.g., change in the Hall voltage or in the specific resistance) of an individual sensor element, e.g., Wi, generally depends on a component of the resultant magnetic field $B(r_i)$ at the position $r_i$ of the sensor element and on further parameters $λ_i$, e.g., the supply current flowing through the sensor element. The relevant component of the magnetic field can be calculated by virtue of taking the scalar product of the resultant magnetic field with the sensitive direction $e_i$ of the sensor element. The following equation emerges for each sensor element:

$$Wi = f(e_i \cdot B(r_i), λ_i), \quad (1)$$

where the function $f$ models the response of the sensor element. By way of example, for a Hall element, $f$ could be modeled as a linear function with a certain sensitivity and a certain offset. For lateral Hall plates, which respond sensitively to the out-of-plane component (z-component), the equation reduces to $Wi = Zi = f(B_z(r_i), λ_i)$. For vertical Hall plates, which are sensitive in the x-direction, the equation reduces to $Wi = Xi = f(B_x(r_i), λ_i)$. Likewise, $Wi = Yi = f(B_y(r_i), λ_i)$ emerges for vertical Hall plates, which are sensitive in the y-direction. The assumption is made that conventional compensations of the sensor elements are known, which is why analytic questions in relation to the differences relating to sensitivity, offset and phase are neglected in the following discussion.

For conventional stray field-robust angle sensors, a few stray field-robust intermediate values ΔWn and ΔWd (n for the numerator and d for the denominator) are determined at the outputs of the individual sensor elements. This can be implemented in the analog or digital domain. For sensors with four sensor elements (measuring Z1, Z2, Z3 and Z4), stray field-robust combination signals ΔZn=Z4–Z2 and ΔZd=Z1–Z3 can be determined in the analog domain using differential amplifiers or differential input ADCs. For sensors with three sensor elements (measuring Z1, Z2 and Z3), corresponding stray field-robust combination signals can be ascertained as ΔZn=(Z3–Z2)*sqrt(3) and ΔZd=(2*Z1–Z2–Z3). Therefore, they are more complex and a digital calculation might be better suited. From these first and second stray field-robust combination signals ΔZn and ΔZd, the rotation angle can be calculated as per $$θ_{est} = \operatorname{atan}\left(\frac{ΔZn}{ΔZd}\right). \quad (2)$$

The arctangent function a tan(n/d) can be replaced by a tan 2(n,d) in order to obtain the full 360°.

Corresponding stray field-robust combination signals can be determined for the stray field-robust, displacement-compensated angle sensors proposed here. For an angle sensor comprising 4*2 magnetic field sensor elements, it is possible to define the four combination signals as per $$\Delta Zn = Z4 - Z2,$$

$$\Delta Zd = Z1 - Z3,$$

$$\Delta Vn = Y4 - Y2, \text{ and}$$

$$\Delta Vd = X1 - X3.$$

For an angle sensor comprising 3*2 magnetic field sensor elements, it is possible to define the four combination signals as per $$\Delta Zn = (Z3 - Z2)*\text{sqrt}(3),$$

$$\Delta Zd = (2*Z1 - Z2 - Z3),$$

$$\Delta Vn = (V3 - V2)*\text{sqrt}(3), \text{ and}$$

$$\Delta Vd = (2*V1 - V2 - V3).$$

In angle applications, these combination signals can be described relatively well by a first order Fourier sequence in the angle $\theta$, with the Fourier coefficients depending on the displacement (Rx, Ry) of the magnet 12 from the nominal center of rotation 13. According to some example implementations, the four combination signals can be modeled as per $$\Delta Zn = z_{nc}(Rx,Ry) \cdot \cos\theta + z_{ns}(Rx,Ry) \cdot \sin\theta + z_{n0}(Rx,Ry),$$

$$\Delta Zd = z_{dc}(Rx,Ry) \cdot \cos\theta + z_{ds}(Rx,Ry) \cdot \sin\theta + z_{d0}(Rx,Ry),$$

$$\Delta Vn = v_{nc}(Rx,Ry) \cdot \cos\theta + v_{ns}(Rx,Ry) \cdot \sin\theta + v_{n0}(Rx,Ry),$$

$$\Delta Vd = v_{dc}(Rx,Ry) \cdot \cos\theta + v_{ds}(Rx,Ry) \cdot \sin\theta + v_{d0}(Rx,Ry), \quad (3).$$

According to some example implementations, the Fourier coefficients $w_{ij}(Rx, Ry)$ with $w \in \{v, z\}$, $i \in \{n, d\}$ and $j \in \{c, s, 0\}$ of the aforementioned first order Fourier series can be respectively modeled as a second order Taylor series in the displacement (Rx, Ry):

$$w_{ij}(Rx,Ry) = w_{ijxx} \cdot Rx^2 + w_{ijxy} \cdot Rx \cdot Ry + w_{ijyy} \cdot Ry^2 + w_{ijx} \cdot Rx + w_{ijy} \cdot Ry + w_{ij0}. \quad (4).$$

Figure 4:
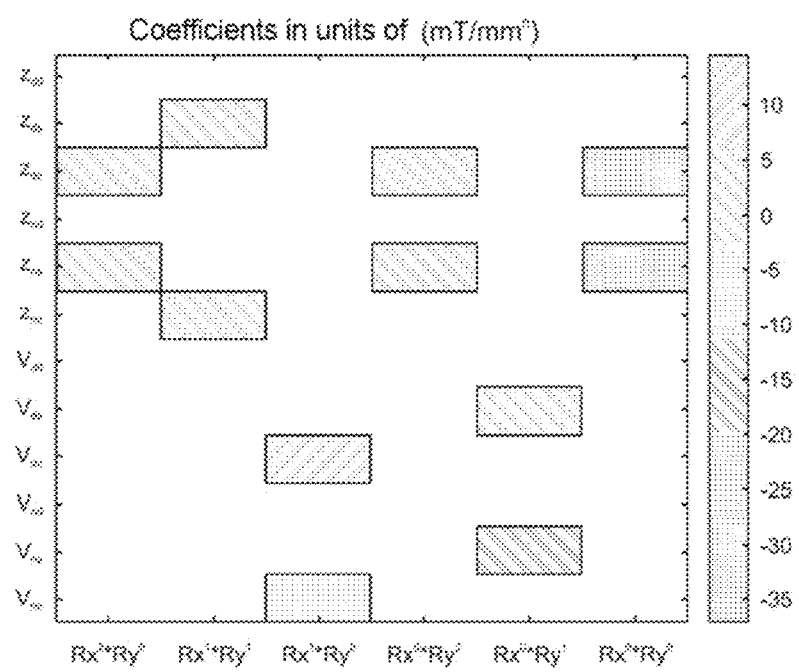
FIG. 4 shows an example of Taylor coefficients which were extracted from numerical simulations for an example magneto-mechanical system.

For symmetric geometries of the magnetic field sensor elements, most of the Taylor coefficients either disappear or depend directly on other Taylor coefficients. Therefore, only a few coefficients are used in some cases to correctly describe the system response for symmetric geometries. To this end, FIG. 4 shows an example of Taylor coefficients which were extracted from numerical simulations for a specific magneto-mechanical system. In this system, only 12 coefficients ($z_{dcxx} = z_{nsyy}$; $z_{nsxx} = z_{dcyy}$; $z_{dsxy} = z_{ncxy}$; $v_{dcx} = -v_{nsy}$; $v_{ncx} = -v_{dsy}$; and $z_{dc0} = z_{ns0}$) of the total of 72 coefficients are not equal to zero and only 6 coefficients are independent.

These few Taylor coefficients can be determined in advance from calculations, device simulations, characterization or calibration. For the characterization and calibration, it is possible, for example, to measure in each case the combination signals $\Delta Zn$, $\Delta Zd$, $\Delta Vn$ and $\Delta Vd$ for at least one complete revolution of the test object 11 with different, predefined displacements (Rx, Ry). Then, the best set of Taylor coefficients can be ascertained by virtue of comparing these data with the model which is described by equations (3) and (4). The Taylor coefficients thus ascertained can then be stored, for example, in a memory which can be accessed by the processor 26, 36.

Naturally, more precise formulations or models can be chosen for greater accuracy. These could include non-linear transfer curves for the response of a sensor element, offset and sensitivity compensation, which may depend on temperature and mechanical load.

As soon as the relevant coefficients are available, rotation angle $\theta$ and displacement (Rx, Ry) can be estimated for any available set of measurements or combination signals $\Delta Zn$, $\Delta Zd$, $\Delta Vn$, and $\Delta Vd$. Estimating rotation angle $\theta$ and displacement (Rx, Ry) corresponds to inverting the system of nonlinear equations (3)-(4). In this respect, the literature has disclosed various numerical methods for solving such systems of equations. Two example methods are explained in more detail below; these appear well-suited to the respective problem. Iterative processes are well suited to inverting this system of equations as long as the displacements are relatively small.

Figure 5:
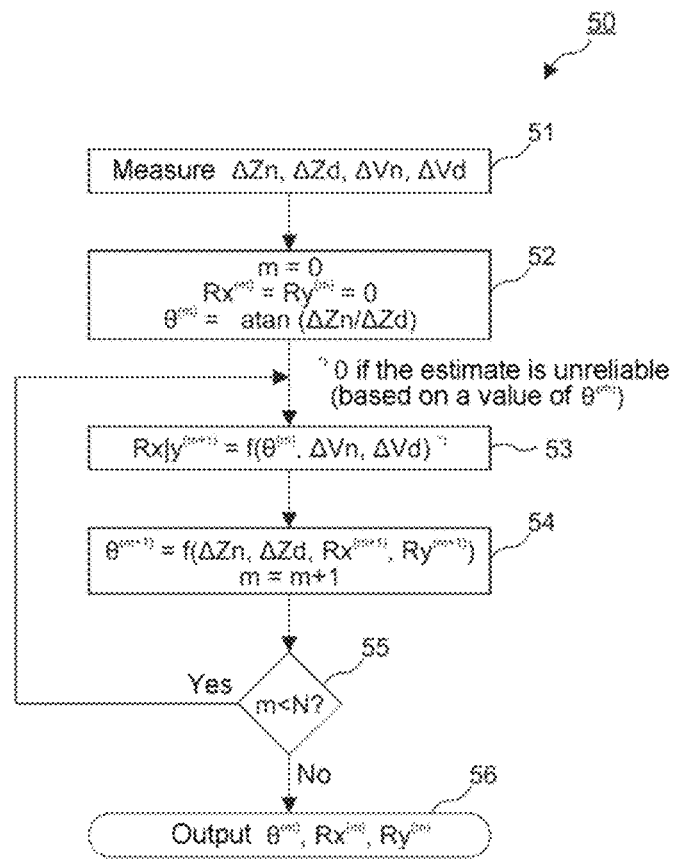
FIG. 5 shows an example of a first iterative process for ascertaining rotation angle θ and displacement (Rx, Ry)

A first iterative process 50 for ascertaining rotation angle $\theta$ and displacement (Rx, Ry) is illustrated in FIG. 5.

Initially, the combination signals $\Delta Zn$, $\Delta Zd$, $\Delta Vn$, and $\Delta Vd$ are ascertained for a still unknown rotation angle $\theta$ from the measurement signals of the first and second magnetic field sensor elements. At 52, the iteration counter is set to zero, m=0. Under the initial assumption that the displacements are $Rx^{(m)} = Ry^{(m)} = 0$, it is possible to calculate a first estimate $\theta^{(m)}$ for the rotation angle. It is evident from FIG. 4 that only $z_{dc}^{(m)} = z_{dc}(0,0)$ and $z_{ns}^{(m)} = z_{ns}(0,0)$ are not equal to zero, while all other Fourier coefficients for $Rx^{(m)} = Ry^{(m)} = 0$ vanish, and so the initial estimate $\theta^{(0)}$ (0 iterations) for the angle is given by $$\theta^{(0)} = \operatorname{atan}\left(\frac{z_{dc}^{(0)} \cdot \Delta Zn}{z_{ns}^{(0)} \cdot \Delta Zd}\right) = \operatorname{atan}\left(\frac{\sin\theta^{(0)}}{\cos\theta^{(0)}}\right). \quad (5)$$

This initial estimate $\theta^{(0)}$ for the angle can then be used to update the estimated values for the displacements $Rx^{(m+1)}$ and $Ry^{(m+1)}$ at 53. From FIG. 4, it emerges that, for $\Delta Vn$ and $\Delta Vd$, only the linear Taylor coefficients $v_{dcx} = -v_{nsy}$; $v_{ncx} = -v_{dsy}$ are not equal to zero. Consequently, the following linear system of equations can be calculated:

$$\begin{pmatrix} Rx^{(m+1)} \\ Ry^{(m+1)} \end{pmatrix} = \begin{pmatrix} v_{ncx} \cdot \cos\theta^{(m)} & v_{nsy} \cdot \sin\theta^{(m)} \\ v_{dcx} \cdot \cos\theta^{(m)} & v_{dsy} \cdot \sin\theta^{(m)} \end{pmatrix}^{-1} \cdot \begin{pmatrix} \Delta Vn \\ \Delta Vd \end{pmatrix}. \quad (6)$$

Figure 7:
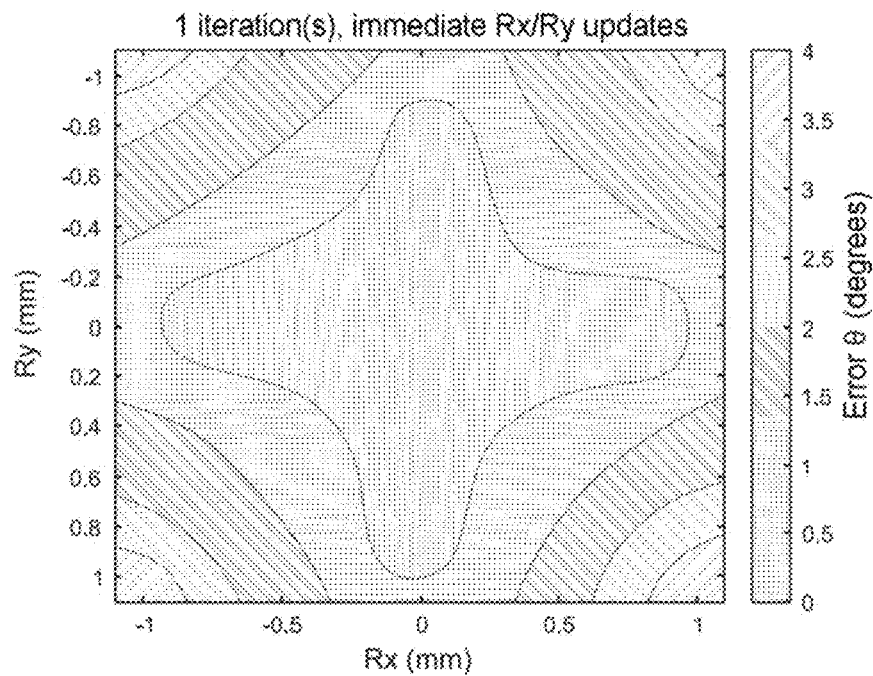
FIG. 7 shows errors in the displacement-corrected rotation angle θ as a result of the displacement in the process as per FIG. 5.

Obviously, the matrix inversion is problematic if $\theta^{(m)}$ is close to an integer multiple of 90°. In such cases, the condition number of the matrix becomes unacceptably large and estimates of Rx (for $\theta^{(m)}$ close to $\pm 90°$) or Ry (for $\theta^{(m)}$ close to 0° and 180°) become unreliable. A possible approach for handling such situations consists in setting unreliable estimates ($Rx^{(m+1)}$ or $Ry^{(m+1)}$) to zero. This can remove instabilities. However, this also prevents an accurate displacement compensation in cases where both displacements Rx and Ry are in fact not equal to zero. However, as long as one of the displacements Rx or Ry is small enough, the method provides good results (see FIG. 7). A second possible approach consists in storing the displacement estimates between a plurality of measurements and only updating those displacements that can be estimated sufficiently accurately.

At 54, an updated estimate $\theta^{(m+1)}$ for the angle is ascertained with the updated displacements $Rx^{(m+1)}$ and $Ry^{(m+1)}$ from 53. To this end, the Taylor coefficients $z_{ij}^{(m+1)}=z_{ij}(Rx^{(m+1)}, Ry^{(m+1)})$, with $i \in \{n,d\}$, and $j \in \{c,s,0\}$ can be calculated using equation (4). Inserting these Taylor coefficients into equation (3) yields the linear system of equations to be calculated:

$$\begin{pmatrix} \cos\theta^{(m+1)} \\ \sin\theta^{(m+1)} \end{pmatrix} = \begin{pmatrix} z_{nc}^{(m+1)} & z_{ns}^{(m+1)} \\ z_{dc}^{(m+1)} & z_{ds}^{(m+1)} \end{pmatrix}^{-1} \cdot \begin{pmatrix} \Delta Zn - z_{n0}^{(m+1)} \\ \Delta Zd - z_{d0}^{(m+1)} \end{pmatrix}. \quad (7)$$

The 2×2 matrix inversion is simple since the condition number of the matrix is close to one (the coefficients $z_{ns}$ and $z_{dc}$ dominate in the case of relatively small displacements). From the solution of equation (7) the updated estimate $\theta^{(m+1)}$ for the angle can be ascertained as per $$\theta^{(m+1)} = \text{atan}\left(\frac{\sin\theta^{(m+1)}}{\cos\theta^{(m+1)}}\right). \quad (8)$$

At 55, a check is carried out as to whether a maximum number N of iterations has been reached. Should this not be the case, the iteration counter is increased by one, m=m+1, and the method continues at 53. A good accuracy already arises after a few iterations in the case of relatively small displacements Rx and Ry. If the maximum number N of iterations has been reached, the estimated values $\theta^{(m)}$, $Rx^{(m)}$, and $Ry^{(m)}$ are output at 56.

Figure 6:
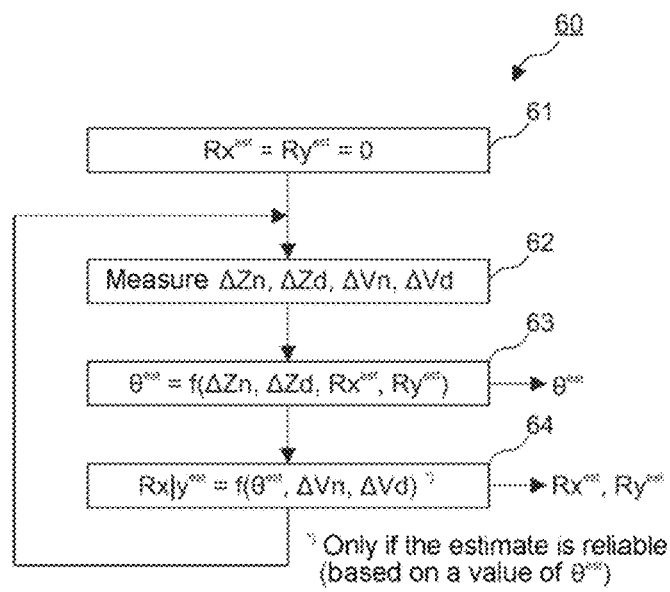
FIG. 6 shows an example of a second iterative process for ascertaining rotation angle θ and displacement (Rx, Ry)

In many angle applications, the angle position changes much faster than the displacements (the unintended inaccuracies of Rx and Ry). Therefore, it may be sufficient to only incrementally update the displacement estimate within the scope of multiple measurements and keep old displacement estimates if the most recent calculation is unreliable. This can be implemented as per an iterative process 60 illustrated in FIG. 6.

Initially, vanishing displacements $Rx^{est}=Ry^{est}=0$ are assumed again at 61. A preliminary angle estimate $\theta^{est}=\theta^{(0)}$ according to equation (5) can be calculated at 63 with a first set of measurement results available at 62. Then, at 64, the displacements $Rx^{est}=Rx^{(m+1)}$ and $Ry^{est}=Ry^{(m+1)}$ can be updated as per equation (6), provided their values are reliable enough for the matrix inversion. By way of example, this means $Rx^{est}$ is updated if $\theta^{est}$ differs sufficiently from ±90° and $Ry^{est}$ is updated if $\theta^{est}$ differs sufficiently from 0° or 180°. On the basis thereof, it is then possible to calculate the relevant Taylor coefficients and an updated (and already final) angle estimated value $\theta^{est}=\theta^{(m+1)}$ as per equations (7) and (8). With the next available set of measurement results or combination signals $\Delta Zn$, $\Delta Zd$, $\Delta Vn$, and $\Delta Vd$, the method is continued at 62 in order to update the angle estimated value $\theta^{est}$. This allows the displacement estimate to be iteratively updated with each new set of measurement results. This dispenses with the need for additional iterations for a higher precision. Moreover, only reliable displacement estimators are taken into account.

According to some example implementations, the displacement estimates can be averaged between various measurements in order to increase their accuracy. By way of example, this could be achieved with digital IIR or FIR filtering. Consequently, the displacements would be updated by way of a filter function, e.g., $[Rx^{est}, \text{state}]=\text{filter}(Rx^{(m+1)}, \text{state})$, once again only in the case of admissible values. The filter function could restrict the influence of measurement noise on the displacement estimates.

Figure 8:
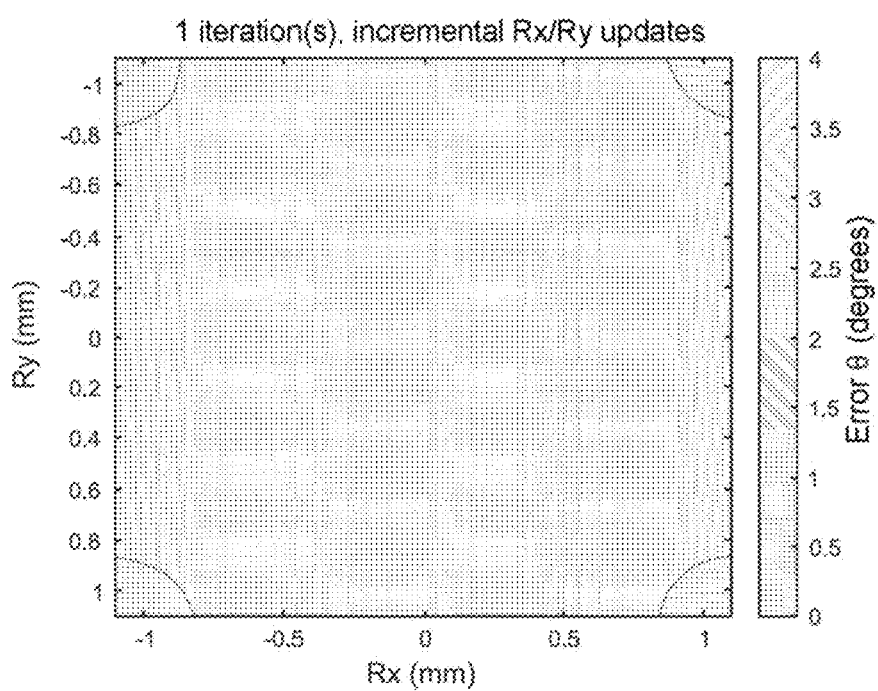
FIG. 8 shows errors in the displacement-corrected rotation angle θ as a result of the displacement in the process as per FIG. 6.

Possible results of the iterative method 60 are shown in FIG. 8. The simulated magnet has a radius of 3 mm. The lateral Hall elements are situated 1 mm from the center of the sensor elements.

Compared to conventional angle sensor concepts, the stray field-robust, displacement-compensated angle sensor concepts described herein comprise additional sensor elements which measure the components of the magnetic field in the plane (e.g., Bx and By). Stray field-robust variables are derived from all available sensor elements in order to determine the angle position and the displacement vector within the meaning of stray field robustness. As a result, the angle position can be determined accurately even if the magnet is displaced out of its optimal position in relation to the sensor elements and/or if a homogeneous interference field is present. Likewise, it is possible to determine three degrees of freedom of a solid (magnet): an angle rotation $\theta$ plus a two-dimensional displacement (Rx, Ry).

The aspects and features which are described together with one or more of the previously detailed examples and figures may also be combined with one or more of the other examples in order to replace an identical feature of the other example or in order to additionally introduce the feature in the other example.

Examples may furthermore be a computer program with program code for executing one or more of the above methods or may relate thereto when the computer program is executed on a computer or a processor. Steps, operations or processes of different methods described above may be executed by programmed computers or processors. Examples may also cover program storage apparatuses, e.g. digital data storage media, which are machine-readable, processor-readable or computer-readable, and code machine-executable, processor-executable or computer-executable programs of instructions. The instructions execute some or all of the steps of the above-described methods or bring about the execution thereof. The program storage apparatuses may comprise or be e.g. digital memories, magnetic storage media such as for example magnetic disks and magnetic tapes, hard disk drives or optically readable digital data storage media. Further examples may also cover computers, processors or control units that are programmed to execute the steps of the above-described methods, or (field) programmable logic arrays ((F)PLAs) or (field) programmable gate arrays ((F)PGAs) that are programmed to execute the steps of the above-described methods.

Only the principles of the disclosure are illustrated by the description and drawings. Furthermore, all examples mentioned here are expressly intended in principle to serve only for illustrative purposes, so as to support the reader in understanding the principles of the disclosure and the concepts provided by the inventor(s) for further refining the technology. All statements made here relating to principles, aspects and examples of the disclosure and concrete examples thereof comprise the counterparts thereof.

A function block designated as "means for . . . " executing a specific function may relate to a circuit designed to execute a specific function. Consequently a "means for something" may be implemented as a "means designed for or suitable for something", e.g. a component or a circuit designed for or suitable for the respective task.

Functions of different elements shown in the figures including those function blocks designated as "means", "means for providing a signal", "means for generating a signal", etc. may be implemented in the form of dedicated hardware, e.g. "a signal provider", "a signal processing unit", "a processor", "a controller" etc., and as hardware capable of executing software in conjunction with associated software. When provided by a processor, the functions may be provided by a single dedicated processor, by a single jointly used processor or by a plurality of individual processors, some or all of which are able to be used jointly. However, the term "processor" or "controller" is far from being limited to hardware capable exclusively of executing software, but rather may encompass digital signal processor hardware (DSP hardware), network processor, application-specific integrated circuit (ASIC), field-programmable logic array (FPGA=Field Programmable Gate Array), read-only memory (ROM) for storing software, random access memory (RAM) and non-volatile storage device (storage). Other hardware, conventional and/or customized, may also be included.

A block diagram may illustrate for example a rough circuit diagram that implements the principles of the disclosure. In a similar manner, a flowchart, a flow diagram, a state transition diagram, a pseudo-code and the like may represent various processes, operations or steps that are represented for example substantially in a computer-readable medium and are thus executed by a computer or processor, regardless of whether such a computer or processor is explicitly shown. Methods disclosed in the description or in the patent claims may be implemented by a component having a means for executing each of the respective steps of these methods.

It is to be understood that the disclosure of a plurality of steps, processes, operations or functions disclosed in the description or the claims should not be interpreted as being in the specific order, unless this is explicitly or implicitly indicated otherwise, e.g. for technical reasons. The disclosure of a plurality of steps or functions therefore does not limit them to a specific order, unless these steps or functions are not interchangeable for technical reasons. Furthermore, in some examples, an individual step, function, process or operation may include a plurality of partial steps, functions, processes or operations and/or be subdivided into them. Such partial steps may be included and be part of the disclosure of this individual step, provided that they are not explicitly excluded.

Furthermore, the claims that follow are hereby incorporated in the detailed description, where each claim may be representative of a separate example by itself. While each claim may be representative of a separate example by itself, it should be taken into consideration that although a dependent claim may refer in the claims to a specific combination with one or more other claims other examples may also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. An apparatus, comprising:
    first magnetic field sensor elements arranged uniformly around an axis of rotation that is in a z-direction, of a magnetic field orientation-influencing test object, and each of which are configured to measure only magnetic field components in the z-direction,
        the first magnetic field sensor elements including at least three first magnetic field sensor elements, and the first magnetic field sensor elements surround the magnetic field orientation-influencing test object;
    second magnetic field sensor elements arranged uniformly around the axis of rotation and each of which are configured to measure only magnetic field components in an xy-plane,
        the second magnetic field sensor elements including at least three second magnetic field sensor elements,
        the second magnetic field sensor elements are arranged on an outer peripheral of the first magnetic field sensor elements, and
        the first magnetic field sensor elements are arranged between the second magnetic field sensor elements and the magnetic field orientation-influencing test object; and
    a device for determining a rotation angle of the magnetic field orientation-influencing test object based on:
        a first combination signal which is based on a difference between at least two first measurement signals associated with the first magnetic field sensor elements,
        a second combination signal which is based on a difference between at least two second measurement signals associated with the first magnetic field sensor elements,
        a third combination signal which is based on a difference between at least two third measurement signals associated with the second magnetic field sensor elements, and
        a fourth combination signal which is based on a difference between at least two fourth measurement signals associated with the second magnetic field sensor elements.

2. The apparatus as claimed in claim 1, wherein the device for ascertaining the rotation angle is further configured to ascertain a displacement of the axis of rotation from a zero position based on the first combination signal, the second combination signal, the third combination signal, and the fourth combination signal.

3. The apparatus as claimed in claim 1, wherein each of the first combination signal, the second combination signal, the third combination signal, and the fourth combination signal is able to be modelled by a respective Fourier series for the rotation angle and wherein Fourier coefficients of each of the Fourier series are respectively able to be modelled by Taylor series for a displacement of the axis of rotation from a zero position and wherein the device for ascertaining the rotation angle is configured to additionally determine the rotation angle based on predefined Taylor coefficients of the Taylor series.

4. The apparatus as claimed in claim 1, wherein the first magnetic field sensor elements have lateral Hall sensor elements and the second magnetic field sensor elements have vertical Hall sensor elements.

5. The apparatus as claimed in claim 1, wherein the magnetic field orientation-influencing test object comprises a shaft, extending in the z-direction, with a magnet mounted to an end of the shaft.

6. The apparatus as claimed in claim 1, wherein N first magnetic field sensor elements are arranged nominally symmetrically with an angular spacing of 360°/N about the axis of rotation and N second magnetic field sensor elements are arranged nominally symmetrically with an angular spacing of 360°/N about the axis of rotation.

7. The apparatus as claimed in claim 1, wherein four first magnetic field sensor elements are arranged nominally symmetrically with an angular spacing of 90° about the axis of rotation and wherein the first combination signal corresponds to a first difference between two measurement signals of first magnetic field sensor elements lying opposite one another at an angle of 180° and the second combination signal corresponds to a second difference of two measurement signals of the other first magnetic field sensor elements lying opposite one another at an angle of 180°,
wherein four second magnetic field sensor elements are arranged with an angular spacing of 90° about the axis of rotation and wherein the third combination signal corresponds to a first difference between two measurement signals of second magnetic field sensor elements lying opposite one another at an angle of 180° and the fourth combination signal corresponds to a second difference of two measurement signals of the other second magnetic field sensor elements lying opposite one another at an angle of 180°.

8. The apparatus as claimed in claim 1, wherein three first magnetic field sensor elements are arranged nominally symmetrically with an angular spacing of 120° about the axis of rotation and wherein the first combination signal corresponds to a first combination of three weighted measurement signals of the first magnetic field sensor elements spaced apart from one another at an angle of 120° and the second combination signal corresponds to a second combination of three weighted measurement signals of the first magnetic field sensor elements,
wherein three second magnetic field sensor elements are arranged nominally symmetrically with an angular spacing of 120° about the axis of rotation and wherein the third combination signal corresponds to a first combination of three weighted measurement signals of the second magnetic field sensor elements spaced apart from one another at an angle of 120° and the fourth combination signal corresponds to a difference of three weighted measurement signals of the second magnetic field sensor elements.

9. The apparatus as claimed in claim 1, wherein the first combination signal ($\Delta Zn$) is able to be modeled by a first Fourier series for the rotation angle ($\theta$) as per $$\Delta Zn = z_{nc}(Rx,Ry) \cdot \cos\theta + z_{ns}(Rx,Ry) \cdot \sin\theta + z_{n0}(Rx,Ry),$$

with Fourier coefficients $z_{nc}$ (Rx, Ry), $z_{ns}$ (Rx, Ry), $z_{n0}$ (Rx, Ry) that depend on a displacement (Rx, Ry) of the axis of rotation,
wherein the second combination signal ($\Delta Zd$) is able to be modeled by a second Fourier series for the rotation angle ($\theta$) as per $$\Delta Zd = z_{dc}(Rx,Ry) \cdot \cos\theta + z_{ds}(Rx,Ry) \cdot \sin\theta + z_{d0}(Rx,Ry),$$

with Fourier coefficients $z_{dc}$ (Rx, Ry), $z_{ds}$ (Rx, Ry), $z_{d0}$ (Rx, Ry) that depend on the displacement (Rx, Ry) of the axis of rotation from a zero position,
wherein the third combination signal ($\Delta Vn$) is able to be modelled by a third Fourier series for the rotation angle ($\theta$) as per $$\Delta Vn = v_{nc}(Rx,Ry) \cdot \cos\theta + v_{ns}(Rx,Ry) \cdot \sin\theta + v_{n0}(Rx,Ry),$$

with Fourier coefficients $v_{nc}$ (Rx, Ry), $v_{ns}$ (Rx, Ry), $v_{n0}$ (Rx, Ry) that depend on the displacement (Rx, Ry) of the axis of rotation,
wherein the fourth combination signal ($\Delta Vd$) is able to be modeled by a fourth Fourier series for the rotation angle $\theta$ as per $$\Delta Vd = v_{dc}(Rx,Ry) \cdot \cos\theta + v_{ds}(Rx,Ry) \cdot \sin\theta + v_{d0}(Rx,Ry),$$

with Fourier coefficients $v_{dc}$ (Rx, Ry), $v_{ds}$ (Rx, Ry), $v_{d0}$ (Rx, Ry) that depend on the displacement (Rx, Ry) of the axis of rotation.

10. The apparatus as claimed in claim 9, wherein the Fourier coefficients $w_{ij}$(Rx, Ry) with $w \in \{v, z\}$, $i \in \{n, d\}$, and $j \in \{c, s, 0\}$ are able to be modeled as Taylor series as per $$w_{ij}(Rx,Ry) = w_{ijxx} \cdot Rx^2 + w_{ijxy} \cdot Rx \cdot Ry + w_{ijyy} \cdot Ry^2 + w_{ijx} \cdot Rx + w_{ijy} \cdot Ry + w_{ij0}$$

with the predefined Taylor coefficients $w_{ijxx}$, $w_{ijxy}$, $w_{ijyy}$, $w_{ijx}$, $w_{ijy}$, $w_{ij0}$.

11. The apparatus as claimed in claim 9, wherein the device for determining the rotation angle is embodied to numerically solve equations of claim 9 to determine optimal estimated values for at least one of the rotation angle or the displacement of the axis of rotation.

12. The apparatus as claimed in claim 10, further comprising a memory for the predefined Taylor coefficients,
wherein values associated with the predefined Taylor coefficients are determined by at least one of calculation, simulation, or calibration.

13. The apparatus as claimed in claim 1, wherein the device for determining the rotation angle is configured to determine, in an initial calculation step, an initial estimated value for the rotation angle based on an assumption of no displacement of the axis of rotation being present, corresponding to a zero position, and based on the first combination signal and the second combination signal.

14. The apparatus as claimed in claim 13, wherein the device for determining the rotation angle is configured to determine the initial estimated value for the rotation angle ($\theta$) based on $$\theta^{(0)} = \operatorname{atan}\left(\frac{z_{dc}^{(0)} \cdot \Delta Zn}{z_{ns}^{(0)} \cdot \Delta Zd}\right)$$

wherein $z_{dc}^{(0)}$, $z_{ns}^{(0)}$ correspond to predetermined Fourier coefficients when there is no displacement of the axis of rotation, corresponding to the zero position, and
wherein $\Delta Zn$ is the first combination signal and $\Delta Zd$ is the second combination signal.

15. The apparatus as claimed in claim 10, wherein the device for determining the rotation angle is configured to determine an updated estimated value for the displacement of the axis of rotation based on a current estimated value for the rotation angle, the third combination signal, the fourth combination signal, and the predefined Taylor coefficients.

16. The apparatus as claimed in claim 15, wherein the device for determining the rotation angle is configured to determine the updated estimated value for the displacement of the axis of rotation based on $$\begin{pmatrix} Rx^{(m+1)} \\ Ry^{(m+1)} \end{pmatrix} = \begin{pmatrix} v_{ncx} \cdot \cos\theta^{(m)} & v_{nsy} \cdot \sin\theta^{(m)} \\ v_{dcx} \cdot \cos\theta^{(m)} & v_{dsy} \cdot \sin\theta^{(m)} \end{pmatrix}^{-1} \cdot \begin{pmatrix} \Delta Vn \\ \Delta Vd \end{pmatrix}$$

where m denotes an m-th iteration step.

17. The apparatus as claimed in claim 15, wherein the device for ascertaining the rotation angle is embodied to ascertain updated Fourier coefficients on the basis of the updated estimated value for the displacement and to ascertain an updated estimated value for the rotation angle on the basis of the updated Fourier coefficients and the first and second combination signal.

18. The apparatus as claimed in claim 17, wherein the device for determining the rotation angle is configured to determine the updated estimated value for the rotation angle based on $$\begin{pmatrix} \cos\theta^{(m+1)} \\ \sin\theta^{(m+1)} \end{pmatrix} = \begin{pmatrix} z_{nc}^{(m+1)} & z_{ns}^{(m+1)} \\ z_{dc}^{(m+1)} & z_{ds}^{(m+1)} \end{pmatrix}^{-1} \cdot \begin{pmatrix} \Delta Zn - z_{n0}^{(m+1)} \\ \Delta Zd - z_{d0}^{(m+1)} \end{pmatrix}$$

where m denotes an m-th iteration step.

19. A method, comprising:

determining a first combination signal based on a difference between at least two first measurement signals associated with first magnetic field sensor elements, wherein the first magnetic field sensor elements include at least three first magnetic field sensor elements, each of which are configured to measure only magnetic field components in a z-direction, arranged uniformly around an axis of rotation in the z-direction of a magnetic field orientation-influencing test object, and wherein the first magnetic field sensor elements surround the magnetic field orientation-influencing test object;

determining a second combination signal based on a difference between at least two second measurement signals associated with the first magnetic field sensor elements;

determining a third combination signal based on a difference between at least two third measurement signals associated with second magnetic field sensor elements, wherein the second magnetic field sensor elements include at least three second magnetic field sensor elements, each of which are configured to measure only magnetic field components in an xy-plane, arranged uniformly about the axis of rotation, wherein the second magnetic field sensor elements are arranged on an outer peripheral of the first magnetic field sensor elements, and wherein the first magnetic field sensor elements are arranged between the second magnetic field sensor elements and the magnetic field orientation-influencing test object;

determining a fourth combination signal based on a difference between at least two fourth measurement signals associated with the second magnetic field sensor elements; and determining a rotation angle of the magnetic field orientation-influencing test object based on the first combination signal, the second combination signal, the third combination signal, and the fourth combination signal.

20. The method of claim 19, wherein determining the rotation angle comprises:

determining a displacement of the axis of rotation from a zero position based on the first combination signal, the second combination signal, the third combination signal, and the fourth combination signal.

* * * * *